US007799285B2

United States Patent
Huziwara et al.

(10) Patent No.: US 7,799,285 B2
(45) Date of Patent: Sep. 21, 2010

(54) STRIPPING APPARATUS FOR THE GAS-SOLID SEPARATION IN A FLUIDIZED BED

(75) Inventors: Wilson Kenzo Huziwara, Rio de Janeiro (BR); Claudio Maria de Lacerda Alvarenga Baptista, Rio de Janeiro (BR); Henrique Soares Cerqueira, Rio de Janeiro (BR); José Mozart Fusco, Niterói (BR)

(73) Assignee: Petróleo Brasileiro S.A.-Petrobras, Rio de Janeiro (BR)

( * ) Notice: Subject to any disclaimer, the term of this patent is extended or adjusted under 35 U.S.C. 154(b) by 619 days.

(21) Appl. No.: 11/783,484

(22) Filed: Apr. 10, 2007

(65) Prior Publication Data
US 2008/0253937 A1 Oct. 16, 2008

(51) Int. Cl.
*B01J 8/18* (2006.01)
*F27B 15/08* (2006.01)
*F02M 29/04* (2006.01)
*B01D 3/00* (2006.01)

(52) U.S. Cl. .................. 422/144; 422/139; 422/145; 261/114.5; 202/239

(58) Field of Classification Search ............... 422/139, 422/144, 145; 202/239; 261/114.5
See application file for complete search history.

(56) References Cited

U.S. PATENT DOCUMENTS

| 6,780,308 | B1* | 8/2004 | Hedrick et al. | 208/113 |
| 7,118,715 | B1* | 10/2006 | Hedrick et al. | 422/144 |
| 7,276,210 | B2* | 10/2007 | Cerqueira et al. | 422/144 |
| 2002/0008052 | A1* | 1/2002 | Hedrick | 208/113 |
| 2002/0094313 | A1* | 7/2002 | Lu et al. | 422/216 |
| 2004/0184970 | A1* | 9/2004 | Lu et al. | 422/168 |
| 2005/0040075 | A1* | 2/2005 | Cerqueira et al. | 208/113 |

* cited by examiner

*Primary Examiner*—Walter D Griffin
*Assistant Examiner*—Huy-Tram Nguyen
(74) *Attorney, Agent, or Firm*—Nixon & Vanderhye PC

(57) ABSTRACT

A stripping apparatus is described for the gas-solid separation process in a fluidized bed in a counter-current flow of a stripping fluid. The apparatus includes sets of perforated baffle-plates with holes, fixed in series, alternating central and lateral plates inside a stripping chamber. The holes in the baffle-plates, in number, size and in circular or elliptical layout, are oriented in offset position in relation to the holes in the parallel and subsequent baffle-plates, reducing the damage of erosion on the perforated baffle-plates and optimizing stripping of the fluidized solid particles.

13 Claims, 2 Drawing Sheets

State of the Art

STRIPPING APPARATUS FOR THE GAS-SOLID SEPARATION IN A FLUIDIZED BED

FIELD OF THE INVENTION

The present stripping apparatus for gas-solid separation process in a fluidized bed belongs to the field of equipments for the removal of components adsorbed on porous solid particles, in contact with a counter-current flow stripping fluid, such as found in a fluid catalytic cracking unit—FCCU in petroleum refining. More specifically, it refers to a device that includes perforated baffle-plates with holes, in serial sets, fixed inside a stripper. The geometry, distribution, and size of the holes enhance process efficiency and lower erosion damage on the baffle-plates subjected to the impact of fluidized particles.

BACKGROUND OF THE INVENTION

Inside a stripper, a gas-solid separation process in a fluidized bed is basically a mass transfer process between a gaseous stripping fluid flow and a fluidized bed of solid particles.

In the petroleum refining, the purpose of the catalyst stripper of fluid catalytic cracking unit—FCCU is to remove the hydrocarbons adsorbed on the catalyst (spent catalyst) during the cracking reaction, before the regeneration stage.

The efficiency of the catalyst stripper has a significant impact on the overall profitability of an FCCU. Poor stripping reduces the efficiency of the process beyond causing higher temperatures in the regeneration stage, increasing the deactivation of the catalyst and the mechanical wear out on the processing unit.

The stripper performance is a function of several operational and design parameters.

In order to improve the contact between the stripping fluid and the spent catalyst and to enhance the efficiency of the gas-solid separation, an FCCU stripper contains internals. In this way, the use of strippers depends intrinsically on the proper selection of internals. The most commonly used are known as baffle-plates.

The petitioner's patent application PI 0403239 (U.S. application Ser. No. 10/643,968 filed Aug. 20, 2003), fully incorporated herein by reference, teaches a stripping apparatus in the spatial arrangement of the segmented baffles, parallel, arranged in sequence, the segment number as well as the plate thickness being dimensioned so as to reduce the coalescence of the bubble size of the stripping fluid as well as an homogeneous fluid dynamic distribution of the catalyst flux turbulence throughout the stripping vessel being secured. However, the geometry of the segmented baffle-plates, as proposed, does not eliminate the central stagnation zones, which results in a reduced stripping volume. Besides, the straight rips generate points of stress and allow the plates to become less resistant to erosion. Also, the segmentation does not allow for manufacturing baffle-plates in sizes suitable for industrial application.

Thus, the disadvantages of the technique are outweighed by this invention, described below, as regards a stripping apparatus for gas-solid separation process in a fluidized bed that maximizes the stripping volume and reduces erosion of the perforated baffle-plates of a stripper inside a separator vessel in an FCCU.

SUMMARY OF THE INVENTION

Broadly, the invention relates to a stripping apparatus for the gas-solid separation process in a fluidized bed.

In the field of petroleum refining, a stripper is part of a gas-solid separator vessel in a fluid catalytic cracking unit—FCCU. The process of separating hydrocarbons adsorbed on porous solid particles of a catalyst occurs in the stripper. This is basically a process of mass transfer, where the fluidized catalyst comes into contact with a gaseous stripping fluid in a counter-current flow inside a stripping chamber. The apparatus of this invention includes at least two sets of baffle-plates perforated with holes, approximately parallel to each other, distributed in series, in a row, alternating central and lateral plates inside a stripping chamber.

The baffle-plates are perforated with holes, in a circular or elliptical geometry, uniformly sized and distributed on the surface area of the plates where the holes are positioned offset in relation to the holes of the parallel, sequential baffle-plates, which leads to a homogeneous fluid flow and maximization of the stripping volume within the stripping chamber.

In this way, the stripping apparatus maximizes the stripping volume while prevents the formation of stagnation zones in the stripping chamber.

Moreover, the stripping apparatus promotes bubble-breaking of the vaporized stripping fluid that rise in counter-current flow, which facilitates gas-solid contact necessary to the gas-solid separation process.

Also, the stripping apparatus provides a reduction of erosion damage in the perforated plates, as long as the circular or elliptical geometry of the holes does not generate points of stress in the material used in their manufacture.

Therefore, the stripping apparatus of this invention optimizes the process of separating the lighter hydrocarbons components adsorbed on the solid particles, in a fluidized bed, such as the spent catalyst in a petroleum refining FCCU.

BRIEF DESCRIPTION OF THE DRAWINGS

These and other objects and advantages of this invention will be more completely understood in conjunction with the accompanying drawings, in which.

DETAILED DESCRIPTION OF THE INVENTION

In a gas-solid separation process in a fluidized bed within a stripping chamber, the contact occurs between a fluidized solid particles and a gaseous flowing stripping fluid, in a counter-current flow.

The stripping apparatus of this invention is described below, with the aid of the annexed figures, for an implementation applied in the gas-solid separation process in a petroleum refining fluid catalytic cracking unit—FCCU.

Figure 1:
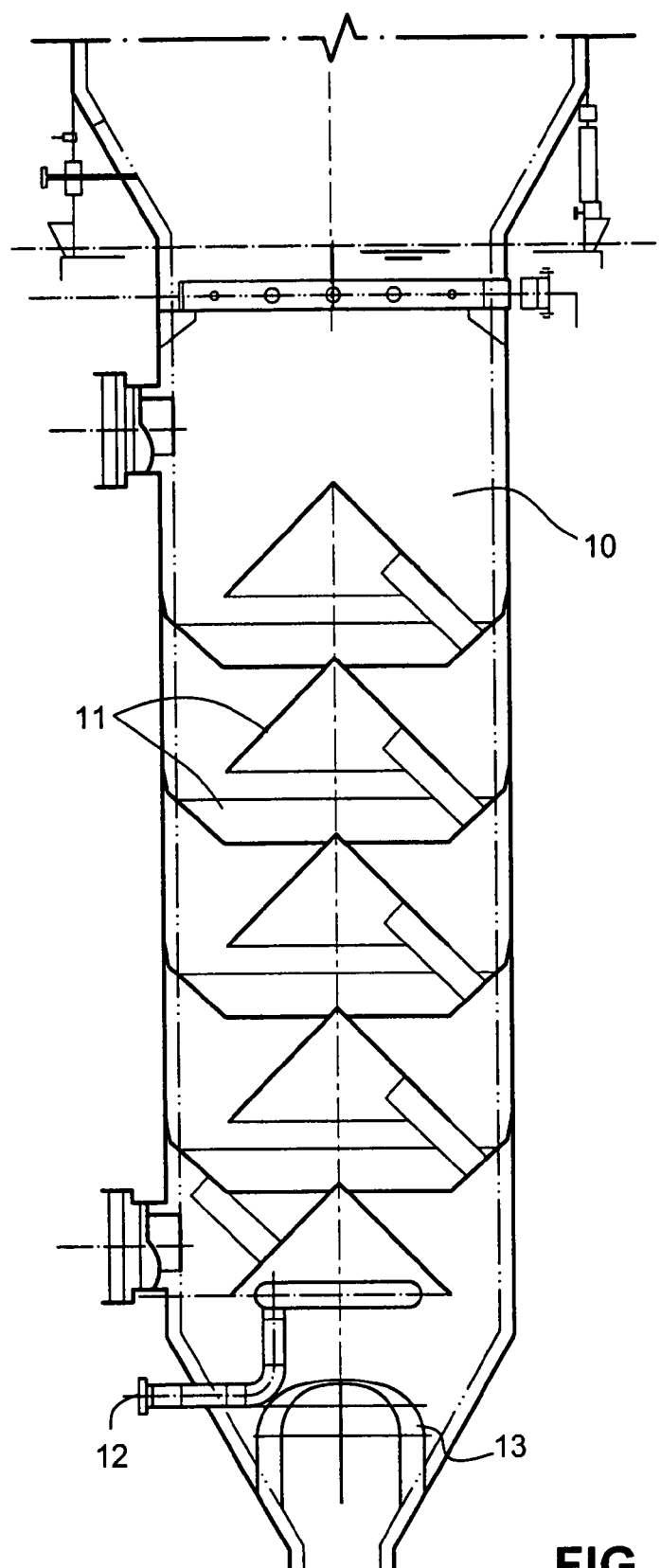
FIG. 1 shows a longitudinal section of a stripper showing the position of the central and lateral baffle-plates (11), in a stripping chamber (10), in accordance with the state of the art.

FIG. 1 shows the parts of a stripper like those used inside a separator vessel (not shown) of an FCCU.

an approximately vertical stripping chamber (10);

baffle-plates (11), laid out in series;

fluid distributor (12) to feed the stripping fluid;

grids (13) to collect the refractory waste and coke;

A stripping process in a FCCU means stripping hydrocarbons from a fluidized bed of solid catalyst particles in which a stripping fluid and a particulate catalyst containing adsorbed hydrocarbons are placed in contact in an approximately vertical stripping chamber, with internals that may be baffle-plates of different types. The stripping fluid is distributed along the stripping chamber, and the baffle-plates are used to improve the reduction of the size of stripping fluid bubbles that together with the desorbed hydrocarbons are recovered through the top of the stripping chamber. The width of the baffle-plates and the spacing among them are sized in such a way as to reduce and optimize desorption of the hydrocarbons from the fluidized solid catalyst, the particles of the stripped catalyst being withdrawn from the bottom of the stripping chamber.

Hence, the major objective of this invention is to enhance the efficiency of the stripping process of gas-solid separation that use perforated baffle-plates as internals inside a stripping chamber.

Figure 2A:
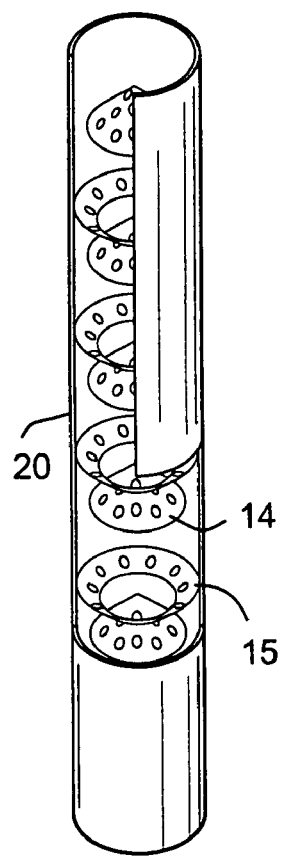
FIG. 2A shows a longitudinal section of a stripping chamber (20) with baffle-plates perforated with holes, central (14) disk type and lateral (15) donut type plates, in an implementation of this invention.

FIG. 2A presents the preferred implementation of this invention that refers to a stripping apparatus for the gas-solid separation process, applicable to an FCCU which includes sets of baffle-plates which are perforated with holes, parallel to each other, alternating center (14) disk type and lateral (15) donut type of plates, which are fixed in series of sets inside a stripping chamber (20).

The holes (21a) and (21b), which are in a circular or elliptical geometry, are of a uniform size and distribution on the surface area of the baffle-plates which are parallel.

The sets are made up of two or three baffle-plates perforated with holes, parallel, that are fixed in series, in a row, inside the stripping chamber, in such a way that the holes (21a) are oriented in offset position in relation to the holes (21b) of the subsequent baffle-plates, making the fluid flow homogenously in the vertical and horizontal direction and maximizing the stripping volume inside the stripping chamber.

The number of sets of baffle-plates with holes is limited by the interior space in the stripping chamber (20) which should not be excessively loaded.

In order to promote the horizontal and vertical displacement of the fluidized solid particles, the sets of baffle-plates with holes must be fixed in series, in a row, keeping the subsequent plates approximately parallel to each other, preferably alternating central (14) and lateral (15) baffle-plates.

The plates may be positioned in parallel horizontally or with a slant of from 20 to 45 degrees to the horizontal axis of the stripping chamber. In the case of sets of baffle-plates of donut type, the slope may vary of from 30 to 60 degrees to the vertical axis of the stripping chamber.

The holes are uniformly distributed over the entire surface area of the stripping plates, which eliminates stagnation zones and maximizes the stripping volume. The circular or elliptical geometry of the holes reduces erosion damage caused by the impact of fluidized particles against the baffle-plates with holes, which allows them to be manufactured without a refractory surface. Thus perforated, the baffle-plates may be manufactured in an industrial scale size.

The holes (21a) and (21b) in circular geometry may have a diameter of from 25 to 150 mm, preferably from 50 to 75 mm. In the elliptical geometry, the holes (21a) and (21b) may have the shorter axis of from 25 to 150 mm, preferably from 50 to 75 mm, and the longer axis in the range of 1 to 5 times the size of the shorter axis or, preferably, in the range of from 2 to 3 times longer.

In both geometry, either circular or elliptical, the holes (21a) and (21b) may correspond to a free spacing from 10 to 50% of the surface area on the baffle-plates with holes or, preferably, from 20 to 30%.

Figure 2B:
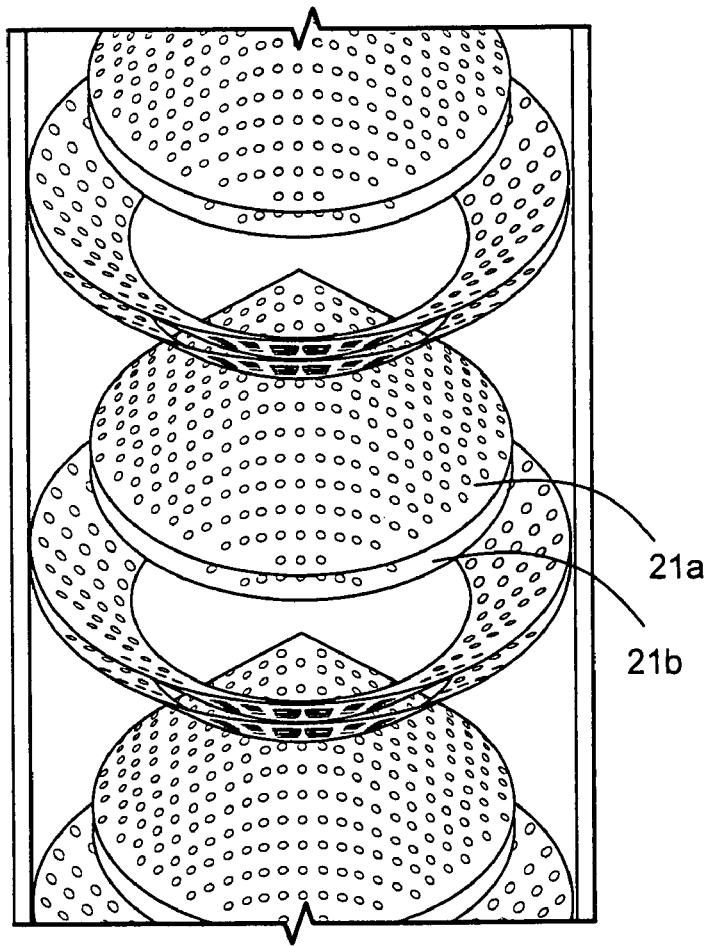
FIG. 2B shows an enlarged view of part of FIG. 2A with a set of baffle-plates (sets of disk and donut types) perforated with holes, with the holes (21a) oriented in offset position in relation to the holes (21b) of subsequent parallel plate.

This distribution of the holes (21a) and (21b), offset as shown in FIG. 2B, makes the flowing catalyst homogenous, generating a shower of catalyst and insuring the turbulence necessary to the stripping process. Thus, the fluid flow becomes homogenized in the vertical and horizontal direction and the stripping volume is maximized by the elimination of stagnant zones, enhancing the efficiency of the gas-solid separation process in a fluidized bed.

Therefore, this invention is applicable to a stripping process of adsorbed hydrocarbons on solid fluidized particles in a petroleum refining FCCU and surpasses the technical results of the known techniques. Additionally it is applicable to any process whose goal is to separate gas-solids in a fluidized particle bed in contact with a stripping fluid in a counter-current flow.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. Stripping apparatus for the gas-solid separation process in a fluidized bed that includes a stripping chamber, approximately vertical, with baffle-plates and a stripping fluid distributor in its interior,
   comprising perforated baffle-plates with holes, in a circular or elliptical geometry, uniformly sized and distributed over the surface area of said baffle-plates, making up sets of at least two adjacent parallel perforated baffle-plates that are fixed in series, alternating center plate sets and lateral plate sets, inside the stripping chamber, where the holes of each plate are oriented in offset position in relation to the holes on adjacent parallel and subsequent plates, resulting in a homogeneous fluid flow and in a maximized stripping volume inside the stripping chamber.

2. Stripping apparatus according to claim 1, wherein the holes in a circular geometry have a diameter of from 25 to 150 mm.

3. Stripping apparatus according to claim 1, wherein the holes in an elliptical geometry have the shorter axis of from 25 to 150 mm and a longer axis within a range of 1 to 5 times the shorter axis.

4. Stripping apparatus according to claim 1, wherein the holes in an elliptical geometry have the shorter axis of from 50 to 75 mm and the longer axis within a range of 1 to 5 times the shorter axis.

5. Stripping apparatus according to claim 3, wherein the holes in an elliptical geometry have the longer axis within a range of 2 to 3 times the shorter axis.

6. Stripping apparatus according to claim 4, wherein the holes in an elliptical geometry have the longer axis within a range of 2 to 3 times the shorter axis.

7. Stripping apparatus according to claim 1, wherein the holes in a circular or elliptical geometry correspond to a free area from 10 to 50% of the surface area of the perforated baffle-plates with holes.

8. Stripping apparatus according to claim 1, wherein the holes in an elliptical geometry correspond to a free area between 20 and 30% of the surface area of the perforated baffle-plates with holes.

9. Stripping apparatus according to claim 1, wherein the sets of perforated baffle-plates each comprise 2 or 3 baffle-plates with holes.

10. Stripping apparatus according to claim 1, wherein the center sets of perforated baffle-plates with holes present a slope in the plates of from 20 to 45 degrees from the horizontal axis of the stripping chamber.

11. Stripping apparatus according to claim 1 wherein the lateral sets of perforated baffle-plates with holes present the plates approximately parallel to the horizontal axis of the stripping chamber.

12. Stripping apparatus according to claim 1, wherein the lateral sets of perforated baffle-plates are of donut type and have a slope of from 30 to 60 degrees from the vertical axis of the stripping chamber.

13. Stripping apparatus according to claim 1, wherein said baffle-plates are disposed in a vertical center portion of the stripping chamber, the vertical center portion of the stripping chamber is free from a riser conduit, and holes through said center baffle-plate sets are limited to said uniformly sized and distributed holes.

* * * * *